United States Patent [19]

Cargle et al.

[11] Patent Number: 4,599,250
[45] Date of Patent: Jul. 8, 1986

[54] FREEZE CONDITIONING AGENT FOR PARTICULATE SOLIDS

[75] Inventors: Virgil H. Cargle, Houston, Tex.; Max L. Robbins, South Orange; Jan Bock, Bridgewater, both of N.J.

[73] Assignee: Exxon Research & Engineering Co., Florham Park, N.J.

[21] Appl. No.: 442,879

[22] Filed: Nov. 19, 1982

[51] Int. Cl.$^4$ .......... B05D 7/00; C09K 3/18; C10L 9/00; C10L 10/00
[52] U.S. Cl. .......... 427/220; 44/6; 106/13; 252/70
[58] Field of Search .......... 44/6; 427/220; 106/13; 252/70

[56] References Cited

U.S. PATENT DOCUMENTS

| | | | |
|---|---|---|---|
| 3,298,804 | 1/1967 | Schoch | 44/6 |
| 3,412,030 | 11/1968 | Wahlberg | 106/13 X |
| 3,563,714 | 2/1971 | Brewer | 44/6 |
| 3,794,472 | 2/1974 | Macaluso et al. | 44/6 |
| 3,819,522 | 6/1974 | Zmoda et al. | 106/13 X |
| 4,117,214 | 9/1978 | Parks et al. | 44/6 X |
| 4,225,317 | 9/1980 | Kugel | 44/6 |
| 4,312,901 | 1/1982 | Kekish et al. | 106/13 X |

FOREIGN PATENT DOCUMENTS 738061  10/1955  United Kingdom .......... 44/6

OTHER PUBLICATIONS

Kirk-Othmer Encyclopedia of Chemical Technology, vol. 8, 2nd ed., 1965, John Wiley & Sons, Inc., pp. 127–133.
Prince, Leon M., *Microemulsions Theory and Practice*, pp. 33–56, Academic Press, Inc., 1977.
Robb, I. D., *Microemulsions*, pp. 17, 18, 33, 34, Plenum Press, May 1981.

*Primary Examiner*—Michael R. Lusignan
*Attorney, Agent, or Firm*—R. A. Dexter; R. L. Graham

[57] ABSTRACT

A method for treating particulate solids such as coal to reduce the cohesive strength of such solids when frozen which consists of spraying said solids with a hydrocarbon liquid solution of a balanced blend of surfactants which blend will form a single phase microemulsion at 20° C. when added to water at the salinity of the water on said solids at a water to hydrocarbon ratio in the range between 99:1 and 85:15, said blend represented by the monoethanol amine salt of dodecyl o-xylene sulfonic acid and a dinonylphenol reacted with 9 moles of ethylene oxide, onto the wetted surface of said solids to form a single phase microemulsion which is optimally designed to undergo a lipophilic shift upon contacting the surface of said particles whereby an in-situ water-in-oil coarse emulsion is formed on the surfaces of said particles.

6 Claims, No Drawings

FREEZE CONDITIONING AGENT FOR PARTICULATE SOLIDS

This invention relates to surface treatment of particulate solids to prevent water-wetted surfaces from freezing together at water-freezing temperatures.

BACKGROUND OF THE INVENTION

When the surface moisture on particulate solids freezes, the ice acts as a powerful adhesive holding the particles together in a mass, e.g., crushed coal, which with as little as four percent moisture will, when frozen, cohere so strongly as to require special handling to break up the frozen mass. It thus becomes difficult to unload or dump railway cars, trucks and other conveyances used to transport coal, mineral ores and other finely divided solids. It also makes difficult the conversion of the outdoor coal storage piles unto a condition for fuel or other use. Unloading frozen coal from railroad cars is time consuming, can result in blocked dump chutes and can often leave as much as 30 to 60 tons of coal in the car. Various techniques such as vibration, steam lances, fires under the cars, infrared heating in warming sheds and even dynamiting have been tried to unload frozen cars. Another approach is to chemically modify the environment contiguous with the particulate surfaces. Sodium chloride and calcium chloride salts have been added to moist coal as it is being loaded with some degree of success toward reducing the freezing problem. However, such salts contribute to the corrosion of all equipment with which the solids come in contact and are detrimental to the coking process when used with coking coal. Oil has been used to freeze-proof coal with questionable effectiveness. Oil soluble surfactants have been added to the oil but with questionable results. Ethylene glycol has been employed, but although successful, the cost of treatment has been very high.

Referring now to the patent literature there is included:

U.S. Pat. No. 4,117,214 which teaches a composition for reducing the strength of ice featuring a mixture of (A) a water-soluble polyhydroxy compound of a monoalkylether and (B) a water soluble organic nonvolatile compound having a hydrophilic group such as amine, carboxyl or carboxylate, said mixture used in an effective amount, e.g., on the order of about 0.25-5 weight percent, based on the weight of water;

U.S. Pat. No. 3,298,804 is directed to the prevention of freezing together of coal particles by a composition of hydrocarbon and a given class of surface-active compounds;

U.S. Pat. No. 3,563,714 is not concerned with freezing but compacting coal particles, however, it teaches spraying coal with a water-in-oil emulsion obtained from a blend in oil of surfactants having an average hydrophilelipophile balance of 10 or less;

U.S. Pat. No. 3,794,472 treats coal with an aqueous emulsion containing a polyhydric alcohol to prevent freezing.

U.S. Pat. No. 4,225,317 treats the coal by spraying coal particles prior to freezing with an effective amount of a hydrocarbon liquid solution of a nonionic surfactant having an HLB between 9.5 and 11.0.

In a co-pending U.S. patent application Ser. No. 508,527, filed June 27, 1983 (now abandoned) which was a Continuation Application of Ser. No. 318,484 filed Nov. 5, 1981 (now abandoned) (of common assignee with this application) there is taught a method for treating particulate solids such as coal having surface moisture which comprises spraying such solids with a minor but at least effective amount of a hydrocarbon liquid solution of a mixture of an anionic surfactant, i.e., a water soluble salt of an alkyl aryl sulfonic acid, and a nonionic surfactant such as dinonylphenol reacted with 9 moles of ethylene oxide, said mixture having an HLB of at least 12.

SUMMARY OF THE INVENTION

It has been discovered that spraying moist coal with a hydrocarbon liquid solution of at least two surfactants so selected and balanced with respect to their combined hydrophilic and lipophilic properties that the said hydrocarbon solution spontaneously disperses in water or aqueous salt solution to form a translucent single phase microemulsion greatly reduces the cohesive strength of said coal subjected to freezing temperatures. The two or more surfactants, at least one of which is anionic such as an alkyl aryl sulfonate, are chosen such that one (or more) forms an oil-continuous emulsion (the lipophile surfactants) and one (or more) forms a water-continuous emulsion (the hydrophile surfactants the respective hydrocarbon and water containing salt at the concentration found on the wet coal. A 1.5 wt % solution of the lipophile in the hydrocarbon should show an interfacial tension against the saline water less than 0.5 dynes/cm and preferably less than 0.2 dynes/cm. A 1.5 wt % solution of the hydrophile in the saline water should show an interfacial tension against the hydrocarbon less than 0.5 dynes/cm and preferably less than 0.2 dynes/cm. The ratio of the hydrophile to lipophile in the hydrocarbon-surfactant solution (hereafter referred to as concentrate) is then adjusted (balanced) such that when the concentrate contacts water containing salt at the concentration found on the wet coal, a translucent single phase microemulsion forms.

Although hydrocarbon-surfactant concentrates thus prepared lower the crush strength of frozen wet coal, best results are obtained with concentrates designed to form homogeneous microemulsion when contacted with saline water which hydrocarbon-surfactant concentrates, in addition, form water-in-oil coarse emulsions on contacting wet coal. This ability to form a water-in-oil emulsion on wet coal is characterized by:

(1) the formation of a translucent single phase microemulsion when 5 parts by volume of the concentrate is contacted with 95 parts of water containing salt at the concentration found on wet coal; and (2) the separation on settling of said microemulsion into a bottom sediment layer, an intermediate clear aqueous layer and a top emulsion and/or microemulsion layer upon adding 2 gms of coal per 10 ml of single phase microemulsion of step (1) and shaking the mixture.

Those concentrates which do not form an intermediate water layer do not form water-in-oil emulsions on wet coal.

In addition to the ability to form water-in-oil emulsions on wet coal, effective concentrates are characterized by very low interfacial tensions of less than 0.1 dynes/cm and preferably less than 0.02 dynes/cm against water containing salt at the concentration found on wet coal.

In accordance with this invention there is provided a method for treating particulate solids having surface moisture to reduce the cohesive strength of such solids when frozen which comprises the step of spraying the particulate solids prior to freezing with an effective amount of a balanced blend of hydrophile and lipophile surfactants in a liquid hydrocarbon at a concentration of 1-50 weight percent which blend will form a single phase microemulsion at 20° C. when added to water at a water to hydrocarbon ratio in the range between 99:1 and 85:15, preferably 95:5, said water being at the salinity of the water on the particulate solids to be treated and said microemulsion when contacted with wet particulate solids preferably forming a water-in-coal coarse emulsion at 20° C.

This novel method for treating particulate solids having surface moisture to reduce the cohesive strength of such solids when frozen, more particularly comprises spraying the particulate solids prior to freezing with an effective amount of a hydrocarbon liquid solution of a two or more surfactants at least one of which is anionic and selected from the group consisting of: alkyl aryl sulfonates and alkyl amine, alkanol amine and ethoxylated alkanol amine salts thereof, alkyl sulfates, ethoxylated alkyl sulfates, alkyl phosphates, alkyl carboxylates and ethoxylated analogs thereof, which hydrocarbon-surfactant solution when added to water containing salt at the concentration found on the wet solids will form at such salinity a translucent single phase microemulsion and preferably result in a water-in-oil emulsion on the surface of said wet solids. The oil solution of the surfactants blend is characterized by having an interfacial tension against water containing salt at the concentration found on the wet solids of less than 0.1 dynes/cm and preferably less than 0.02 dynes/cm.

While the invention has utility in the treatment of a variety of particulate solids having surface moisture to prevent cohesion due to freezing, its greatest usefulness is found in the treatment of coal particles during cold winter weather with said oil solution of a balanced blend of surfactants.

Representative of a preferred hydrophile at salt concentrations from 0.1 to 1 weight percent NaCl is a water-soluble salt of an alkyl aryl sulfonic acid such as the monoethanol amine salt of $C_{12}$ o-xylene sulfonic acid (hereafter designated as $C_{12}$XS-MEA and representative of a preferred lipophile is a di-nonyl phenol ethoxylated with 8.8 moles of ethylene oxide supplied by GAF Corp. New York, N.Y. under the trade name Igepal ® DM 530. Preferred liquid hydrocarbons used to form the concentrate are diesel fuel and kerosene which concentrate forms with saline water a homogeneous microemulsion at 20° C. A homogeneous microemulsion for the purposes of this invention is defined as a single phase, translucent mixture of surfactants, oil and (saline) water which is stable toward phase separation at normal gravity.

DETAILED DESCRIPTION OF THE INVENTION

As earlier discussed, the freeze conditioning agent of the invention comprises (1) a balanced blend of surfactants generally a hydrophile and lipophile and (2) a liquid hydrocarbon which blend must have the property of providing a homogeneous microemulsion of oil and water, said water having the salinity of the water on the surface of the particulate solids. The requisite property is more precisely delineated by the amount of surfactant-oil blend and the salinity and temperature of the surface water which spontaneously generates the homogeneous microemulsion upon coming in contact with the freeze conditioning agent.

(A) Hydrophile

The hydrophile for the purposes of this invention is defined as a surfactant having the properties of providing at 1.5 wt % concentration in equal volumes of the oil and a 0.2 wt % sodium chloride aqueous solution a lower phase microemulsion at 20° C. and provides to said aqueous solution an interfacial tension less than 0.5 dynes/cm when measured against said oil at 20° C.

The hydrophile which thus is defined by a physical property includes but is not confined to the alkyl aryl sulfonates and the ethoxylated alkylphenols.

Representative alkyl aryl sulfonates include monoethanol ammonium dodecyl o-xylene sulfonate, sodium dodecyl benzene sulfonate, ammonium tetradecyl benzene sulfonate, diethanol ammonium hexadecyl benzene sulfonate and sodium dodecyl naphthalene sulfonate.

Representative ethoxylated alkyl phenols include Igepal ® DM 710, Igepal ® DM 730 and Igepal ® DM 880 supplied by GAF which are chemically di-nonyl phenols ethoxylated with 15, 24 and 49 moles of ethylene oxide, respectively. Other suitable ethoxylated alkyl phenols include Tritons ® X100, X102 and X114 supplied by Rohm and Haas of Philadelphia, Pa., and Igepals ® CO 610, 630, 660, 710, 720, 730, 850 and 880 supplied by GAF which are chemically mono-octyl or nonyl phenols ethoxylated with from 8 to 30 moles of ethylene oxide (hereafter EO).

The term "lower phase" microemulsion is descriptive in context since it means that the aforementioned system consisting of the surfactant and equal volumes of oil and saline water separates into an aqueous lower phase containing most of the surfactant in equilibrium with an excess oil phase which is essentially surfactant-free, whereas "upper phase" microemulsion as subsequently used in defining lipophile means that the system consisting of the surfactant in equal volumes of oil and saline water separates into a surfactant containing oil upper phase in equilibrium with an excess aqueous phase which is essentially surfactant-free.

(B) Lipophile

The lipophile similarly for the purposes of this invention is a surfactant having the properties of providing at 1.5 wt % concentration in equal volumes of liquid hydrocarbon and 0.2 wt % sodium chloride aqueous solution a resulting upper phase microemulsion at 20° C. and provides to said hydrocarbon an interfacial tension of less than 0.5, preferably less than 0.2, dynes/cm when measured against said aqueous solution at 20° C.

The lipophile having been defined by a physical property includes but it not confined to the alkyl aryl sulfonates and ethoxylated alkyl phenols.

Representative alkyl aryl sulfonates include monoethanol ammonium tetradecyl o-xylene sulfonate, sodium hexadecyl o-xylene sulfonate, diethanol ammonium pentadecyl o-xylene sulfonate, triethanol ammonium octadecyl o-xylene sulfonate (prepared from penta and hexa propylene), sodium octapropylene benzene sulfonate and various high molecular weight petroleum sulfonates.

Representative ethoxylated alkyl phenols include Igepals ® CO 210 and CO 430 supplied by GAF which are nonyl phenols containing 1.5 and 4 moles of EO respectively, Tritons ® X15 and X35 which are octyl phenols containing 1 and 3 moles of EO, respectively.

(C) Ambiphiles

Surprisingly, it has been found that certain ethoxylated alkyl phenols act both as hydrophiles and lipophiles since the resulting surfactant property is dependent on the ethoxylated surfactant concentration and ratio to the sulfonate co-surfactant. For example, Igepal® DM 530 (hereafter DM 530) at concentrations greater than 1% and ratios to $C_{12}$ XS-MEA greater than about 1:4 acts as a hydrophile and forms lower phase microemulsions with equal volumes of diesel oil and 0.2% aqueous NaCl whereas the same material at concentrations less than 0.5% and ratios less than about 1:9 forms upper phase microemulsions and acts as a lipophile. These surfactants are designed herein as ambiphiles. Representative ambiphiles are Igepal® DM 430 and Igepal® DM 530 supplied by GAF which are dinonyl phenols ethoxylated with 7 and 8.8 moles of EO respectively.

The present invention is not confined to the use of the aforementioned ethoxylated alkyl phenols but includes other ethoxylated surfactants of the generic formula:

$$R_1X(CH_2CH_2O)_nY$$

wherein
$R_1$ is an alkyl or mono- or di-alkyl aryl group containing 8 to 30 carbon atoms;
X is

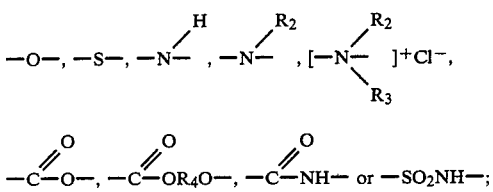

Y is —H, —$SO_3^-$ $M^+$ or —$(PO_3H)^-M^+$ wherein $M^+$ is an inorganic or ammonium cation including alkyl substituted ammonium cations;
$R_2$ is an alky group containing 1 to 20 carbon atoms or a polyethoxy ether group containing from 1 to 30 ($CH_2CH_2O$) groups;
$R_3$ is H or an alkyl group containing 1 to 3 carbon atoms;
$R_4$ is a poly hydroxy group derived from glycerol, glycols, sorbitol, or various sugars; and,
n is an integer of from 1 to 30

The above ethoxylated alky phenols are blended with an alkali metal, ammonium, alkyl ammonium, alkanol ammonium or ethoxylated alkanol ammonium salt of an alkyl or alkyl aryl sulfonic acid of the generic formula $$R-SO_3H$$

wherein
R is an alkyl or alkyl benzene group containing 8–30 carbon atoms in the alkyl chain and the benzene ring may be additionally substituted with one or two alkyl groups containing 1–3 carbon atoms each to provide the balanced blend of surfactants.

(D) The Hydrocarbon Liquid (Oil)

The oil acts as a solvent for the blend of surfactants and enters into the microemulsion with the water of the solid particles to be treated. While any normally liquid hydrocarbon may be employed, it is preferred to use a predominantly aliphatic hydrocarbon oil such as No. 2 diesel fuel oil and kerosene. Other organic liquids that can be used are naphthas, kerosenes, pure hydrocarbon liquids such as white oil, and the like. In certain instances, it is beneficial if from 0.5–10% by weight water is added to the oil which acts as a cosolvent for the surfactants, thus allowing more of the surfactants to be dissolved in the oil.

(E) Cosolvent

Under certain circumstances, particularly when the freeze condition agent is exposed to low temperatures, up to 10, generally 2 to 4, weight percent of a cosolvent is incorporated to prevent low temperature separation of the anionic and/or nonionic surfactant. The cosolvents are of the class of alkylene glycol monoalkyl ethers, $C_2$ to $C_5$ alkanols and mixtures thereof. Representative cosolvents include ethers such as ethylene glycol monopropyl ether, ethylene glycol monoethyl ether, ethylene glycol monomethyl ether, ethylene glycol monobutyl ether, diethylene glycol monomethyl ether, diethylene glycol monoethyl ether, diethylene glycol n-butyl ether, propylene glycol monomethyl ether, dipropylene glycol monomethyl ether and tripropylene glycol monomethyl ether, and alkanols which include straight and branched chain members such as ethanols, propanol, butanol, and pentanol. Of the alkanols, isopropyl alcohol is preferred. Of the ethers, ethylene glycol monobutyl ether is preferred.

(F) Blend of Surfactants

As earlier specified, the blend of surfactants must provide a hydrophile - lipophile couple which under defined conditions of blend concentrations, temperature, water salinity and ratio of oil to water yields an homogeneous microemulsion.

The balancing of surfactant ratios is illustrated by the following example. Various ratios of $C_{12}$ XS-MEA to DM530 from 1:1 to 5:1 are dissolved in No. 2 diesel fuel at a total surfactant concentration of 25 wt % thus forming a series of concentrates. A weight, 0.565gms of each of the concentrates, is added to test tubes each containing 10 ml of the saline water. The tubes are shaken and allowed to settle at ambient temperature. The tubes generally separate into 2 phases. At low $C_{12}$XS-MEA to DM530 ratios, water as one phase settles to the bottom of the tube with a small layer of the microemulsion as the second phase at the top (upper phase microemulsion) separated from the water by a dense cuff of oil-continuous coarse emulsion. At high ratios a small oil layer as one phase rises to the top of the tube and is separated from the microemulsion below as the second phase (lower phase microemulsion) by a dense cuff of water-continuous coarse emulsion. The range of ratios over which the microemulsion shifts from the bottom to the top of the tube is further narrowed until, over some narrow range of ratios, microemulsion fills the whole tube with no excess of water phase and/or oil phase splitting out. For the current example this occurs at a $C_{12}$ XS-MEA to DM530 ratio of 3:1.

Alternatively, the hdyrophile to lipophile ratio can be fixed, at for example 3:1, and the salinity of the water varied. At salinities less than 0.7% the system splits into a lower phase microemulsion in equilibrium with excess oil phase. At salinities higher than 0.7% the system splits into an upper phase microemulsion with excess water phase below. At 0.7% NaCl, a single phase, homogeneous microemulsion forms.

To better understand the invention reference should now be made to the following examples.

EXAMPLE 1

This teaching will demonstrate how the hydrophile and lipophile surfactants were selected in order to obtain the requisite hydrophile-lipophile couple.

Since the alkyl aryl sulfonates are known to give a lipophilic shift on cooling, $C_{12}$XS-MEA was selected for this teaching. A 1.5% solution of this surfactant, in equal volumes of No. 2 diesel oil and 0.2% aqueous NaCl was found to form a lower phase microemulsion which fixes $C_{12}$XS-MEA as the hydrophile. The experiment is repeated with successively higher concentrations of NaCl in the aqueous phase. $C_{12}$XS-MEA forms a lower phase microemulsion in equilibrium with excess oil, i.e., the surfactant resides in the aqueous phase at salinities up to 1.5% NaCl. At 1.6% NaCl, the microemulsion exists in equilibrium with equal volumes of oil and aqueous phase (defined as optimal or "balanced" salinity). At salinities greater than 1.7% NaCl, the surfactant resides in the oil phase to form an upper phase microemulsion in equilibrium with excess water. This demonstrates that with No. 2 diesel oil, $C_{12}$XS-MEA is a hydrophile only for salinities less than 1.5% NaCl. At salinities greater than 1.7% NaCl, $C_{12}$XS-MEA is a lipophile as previously defined. Therefore, the designation whether a surfactant is a hydrophile or lipophile must be within the context of prescribed salinities and oil compositions. Since salinities of water on coal surfaces are generally less than the equivalent of 1.0% NaCl, for the purposes of this disclosure, $C_{12}$XS-MEA is designated a hydrophile.

The system at 1.5% NaCl, which forms a lower phase microemulsion at room temperature, is cooled to 0° C. After equilibration at 0° C., the system forms an upper phase microemulsion demonstrating that the surfactant, $C_{12}$XS-MEA, undergoes a lipophilic shift on cooling. A lipophilic shift is defined as the movement toward upper phase microemulsion.

The interfacial tension (also designated as IFT) of a 1.5% solution of $C_{12}$XS-MEA in 0.2% aqueous NaCl is measured as 0.035 dynes/cm against diesel oil on the Spinning Drop Tensiometer. This IFT is well below the design criterion of 0.2 dynes/cm.

For the lipophile, an ethoxylated dinonyl phenol (Igepal ® DM 430 sold by GAF) containing 7 moles of EO per mole of surfactant is selected. When this surfactant is used at concentrations of 1 to 5%, lower phase microemulsion will form at 0.2% NaCl. However, at surfactant concentrations below 0.5 wt % in conjunction with alkyl aryl sulfonates, Igepal ® DM 430 gives a lipophilic shift with increasing concentration relative to sulfonate.

By means of the above procedure, a hydrophile ($C_{12}$XS-MEA) which used in major proportion gives a lipophilic shift on cooling has been selected to couple with a lipophile (Igepal ® DM 430) which in minor proportion permits balancing the system for 0.2% NaCl and diesel oil.

EXAMPLE 2

Now that the hydrophile and lipophile have been selected to provide the requisite couple, this Example will demonstrate how the blend of surfactants is balanced to provide a single phase microemulsion.

For cost effectiveness, the surfactants at a concentration of approximately 25% in oil are used at a treat level on wet coal corresponding to a water to oil volume ratio of about 95:5. It is useful then to balance the surfactant hydrophile to lipophile ratio so that the surfactants in oil will form a single phase microemulsion when added to 0.2% NaCl at a 95:5 water to oil ratio. This insures that the surfactant-oil combination is readily dispersible in the water coating the coal surface yet close enough to upper phase microemulsion that a small change in conditions such as cooling or selective absorption on coal will drive the system into an upper phase microemulsion. A salinity of 0.2% NaCl is chosen to approximate the salinity of the surface water on No. 1 coal obtained from the Monterey, Colo. mines.

The surfactants are balanced for single phase microemulsion at ambient temperature by varying the Hydrophile to Lipophile (hereafter H/L) weight ratio at fixed salinity or by varying salinity at constant H/L ratio. As an example of the latter technique, the $C_{12}$XS-MEA to Igepal ® DM 430 ratio is fixed at 0.17:0.055 for a total of 0.225 gm in 0.75 ml diesel oil and 14.25 ml aqueous phase. The surfactants are first dissolved in the oil phase and then added to the aqueous phase. The salinity of the aqueous phase is now varied from 0.2% NaCl to 0.8% NaCl in increments of 0.1% salt. At 0.2% and 0.3% NaCl the surfactants reside in the lower aqueous phase in equilibrium with a small layer of oil. The aqueous and oil phases are separated by a cuff of water-continuous coarse emulsion. At 0.4% NaCl a translucent though turbid single phase microemulsion is obtained with no excess oil or water phases present. At 0.5 to 0.8% NaCl the surfactants reside in the upper microemulsion phase in equilibrium with an increasing volume of excess clear aqueous phase. At 0.5% NaCl the upper microemulsion phase occupies 28% of the total volume while at 0.8% NaCl the upper phase occupies only 10% of the total volume. This illustrates the generalization that the more extensive the lipophilic shift, the less water held in the microemulsion phase and the smaller the microemulsion phase volume. This feature is important for controlling the volume of "oily" material available to coat the coal surface. In the above example, the system is balanced for 0.4% NaCl. To balance the system for 0.2% salt the H/L ratio must be decreased. The ratio of $C_{12}$XS-MEA to Igepal ® DM 430 for single phase microemulsion at 0.2% NaCl is 0.168:0.057. Table I, set forth hereafter, lists under the heading "Design Salinity" the salinities at which the respective combinations and ratios of surfactants in diesel oil form single phase microemulsion at a 95:5 water to oil ratio.

TABLE I

EFFECT OF MICROEMULSION PHASE BEHAVIOR ON COAL FREEZE TEST RESULTS

| | | Salinity | | Microemulsion Type | | | U Phase[2] | Freeze Test | |
|---|---|---|---|---|---|---|---|---|---|
| | | Design | Test | | | | | Treat[3] | Strength |
| Surfactants | Ratio | % NaCl | % NaCl | Initial | On Coal[1] | At 0° C. | Vol % | pts/ton | psi |
| None | — | — | — | — | — | — | — | 6 | 140 |
| $C_{12}$BS/DM530 | .17/.055 | — | 0.8 | 2 phase (l) | 2 phase (u) | 2 phase (l) | — | 6 | 46 |
| $C_{12}$XS/DM530 | .17/.055 | 0.8 | 0.8 | 1 phase | 2 phase (u) | 2 phase (u) | — | 6 | 18 |

TABLE I-continued

EFFECT OF MICROEMULSION PHASE BEHAVIOR ON COAL FREEZE TEST RESULTS

| Surfactants | Ratio | Salinity | | Microemulsion Type | | | U Phase[2] Vol % | Freeze Test | |
| --- | --- | --- | --- | --- | --- | --- | --- | --- | --- |
| | | Design % NaCl | Test % NaCl | Initial | On Coal[1] | At 0° C. | | Treat[3] pts/ton | Strength psi |
| $C_{12}XS/DM530$ | .17/.055 | 0.8 | 0.2 | 2 phase (l) | 2 phase (u) | 2 phase (l) | 23 | 6 | 92 |
| CHB/DM430 | .175/.050 | 0.2 | 0.2 | 1 phase | 2 phase (u) | 2 phase (u) | 71 | 6 | 35 |
| $C_{12}XS/DM430/CO210$ | .17/.275/.275 | 0.2 | 0.2 | 1 phase | 2 phase (u) | 2 phase (u) | 8 | | |
| $C_{12}BSEt5/Et7$ | .08/.145 | 0.2 | 0.2 | 1 phase | 1 phase | 2 phase (l) | 0 | 6 | 105 |
| $C_{12}BS/DM530$ | .17/.055 | — | 0.2 | 2 phase (l) | 2 phase (u) | 2 phase (l) | — | 6 | 75 |

[1] 10 ml p.E. on 2 g coal - shake and settle
[2] Upper Phase p.E. formed on contact with coal
[3] Concentrate composition: 26.6 wt % surfactants in diesel oil
$C_{12}BS$ = Monoethanol amine salt of $C_{12}$ benzene sulfonic acid (Conoco SA 597, sold by Conoco Chemicals, Houston, Texas)
$C_{12}XS$ = Monoethanol amine salt of $C_{12}$ o-xylene sulfonic acid (Esso France SA149 sold by Paramins, Esso Chemie, France), also previously designated $C_{12}$XS-MEA
DM530 = Igepal ® DM530, dinonyl phenol with 8.8 moles of ethylene oxide (sold by GAF, N.Y., N.Y.)
$C_{12}BSEt5$ = $C_{12}$ benzene sulfonic acid neutralized with Ethomeen 18/15 (sold by Armak, Chicago, Illinois)
$C_{12}BSEt7$ = $C_{12}$ benzene sulfonic acid neutralized with Ethomeen 18/17 (sold by Armak, Chicago, ILL.)
DM430 = Igepal DM430, dinonyl phenol with 7 moles of ethylene oxide (sold by GAF)
CO210 = Igepal CO 210, nonyl phenol with 1.5 moles of ethylene oxide (sold by GAF)
CHB = Witco CHB sulfonic acid (sold by Witco Chemicals, Paterson, N.J.) believed to be $C_{15}$ (ave.) alkyl benzene sulfonic acid

EXAMPLE 3

It is the purpose of this Example to show that the blends of the invention, i.e., those concentrates which form single phase microemulsions, perform better in coal freeze tests.

Concentrates were prepared containing 26.6 wt % of surfactants at the ratios indicated in Table I. The concentrate containing $C_{12}BS/DM530$ when added to 0.8% aqueous NaCl at 95:5 water to oil ratio formed a milky watercontinuous coarse emulsion. The concentrate containing $C_{12}XS/DM530$ formed a clear single phase microemulsion under the same conditions. These concentrates were used to coat Monterey No. 1 coal prepared as follows.

The coal was sized through a 0.5 inch screen to remove large particles. The coal was then treated to provide a total surface water of 5% at a salinity of 0.8 wt %. The concentrates were sprayed at a treat level of 6 pints/ton onto 10 lbs of coal which was then tumbled in a cement mixer. After complete mixing the coal was transferred to polyethylene bags and tightly sealed.

Cylindrical samples of treated coal were prepared by placing 150 g of treated coal in 2-inch I.D. sections of polyvinyl chloride pipe and compacting the samples by compressing both ends (sealed with heavy plastic film and #10 rubber stoppers). These samples were then placed in a freezer and maintained at 0° F. for a minimum of 20 hours. The frozen coal was then removed from each PVC mold and held at 0° F. for an additional 24 hours.

The compressive strength of each sample of frozen coal was measured using an Instron Testing device. The Instron tester was modified to ensure 0° F. environment during the compressive strength measurement.

The data in Table I show that the $C_{12}BS/DM530$ concentrate which does not form a single phase microemulsion modifies the frozen mass to a compressive strength which is 33% of the untreated coal whereas the $C_{12}XS/DM530$ concentrate which does form a single phase microemulsion reduces the compressive strength to only 13% of that of the untreated coal.

This finding is additionally supported by using the $C_{12}XS/DM530$ concentrate, which performed well on coal covered with 0.8% aqueous NaCl, to treat coal containing 0.2% NaCl. At 0.2% NaCl the concentrate no longer forms a single phase microemulsion but forms a 2 phase system which tends to mix as a water-continuous coarse emulsion. When used at 0.2% NaCl, the $C_{12}XS/DM530$ concentrate no longer performs well as shown by the data in Table I. This situation is rectified by using a concentrate, $C_{15}$ (ave) alkyl benzene sulfonic acid, i.e. CHB/DM430, specifically designed to operate at 0.2% NaCl. The CHB/DM430 concentrate forms a single phase microemulsion at 0.2% NaCl and performs better in coal freeze test than either the $C_{12}XS/DM530$ or $C_{12}BS/DM530$ concentrates which do not form a single phase microemulsion at this salinity.

EXAMPLE 4

Although the data of Example 3 show that the blends of surfactants which form single phase microemulsions perform better in coal freeze tests, it is the purpose of this Example to illustrate that said blends perform even better when they exhibit a lipophilic shift on contact with coal Approximately 10 ml of the 95:5 microemulsion was prepared by dispersing 0.565 gm of the concentrate in 10 ml of aqueous NaCl at the test salinity. This microemulsion was shaken with 2 gm Monterey #1 coal and allowed to settle. The microemulsion type before and after contact with coal is listed in Table I. On settling, those single phase systems which show a lipophilic shift on contacting coal yield an oilcontinuous coarse emulsion which splits into a bottom sediment layer, an intermediate clear aqueous layer and 1 or more top emulsion and/or microemulsion layers. Those systems which do not form an intermediate water layer do not appear to form oil-continuous coarse emulsions on coal.

Examples of systems which do and do not show a lipophilic shift from single to upper phase microemulsion on contacting coal are given in Table I. The CHB/DM430 microemulsion shows a lipophilic shift at a test salinity of 0.2% NaCl which is also the design salinity for this system. A surfactant couple coded $C_{12}BSEt5/Et7$ prepared by neutralizing $C_{12}$ benzene sulfonic acid (Conoco SA597) with Ethomeen ® 18/15 and 18/17 respectively, remains single phase under the same conditions. This implies that the CHB/DM430 system presents an oily environment to the coal surface while the $C_{12}BSEt5/Et7$ system retains its hydrophilic character.

Coal freeze test data in Table I show that the CHB/DM430 concentrate which forms a single phase microemulsion exhibiting a lipophilic shift on coal performs better than the $C_{12}BSEt5/Et7$ concentrate which does not give a lipophilic shift to upper phase microemulsion. The data in Table I also show that the CHB/DM430 concentrate yields a large volume of "oily" material to coat the coal surface.

Although the primary thrust of the foregoing illustrations has been directed to reducing the cohesive strength of ice formed by the freezing of wet coal particle pile, the product blends, concentrates and the method of use have wide applications as for example preventing the freezing of other ore piles such as iron, copper, titanium dioxide, uranium oxide, etc., aircraft wing de-icing to enhance the fragility of ice formed while reducing its adherence to the aircraft skin, preventing plant and orchard damage by reducing the ice adherence to the trees, car window de-icing, highway de-icing particularly of bridges and similarly exposed structures.

The invention in its broader aspect is not limited to the specific details shown and described and departures may be made from such details without departing from the principles of the invention and without sacrificing its chief advantages.

What is claimed is:

1. A method for treating particulate solids having surface moisture which comprises the steps of: (a) spraying the particulate solids prior to exposure to a freezing environment with an effective amount of a blend of hydrophile and lipophile surfactants in a liquid hydrocarbon at a concentration of 1 to 50 weight percent which blend has the property of forming a homogenous microemulsion at 20° C. when added to water at the salinity of said surface moisture on the particulate solids to be sprayed and at a water to hydrocarbon ratio in the range between 99:1 and 85:15; and (b) forming a microemulsion by the resulting admixture of said blend and said surface moisture between said solids whereby the cohesive strength of such solids when frozen is reduced.

2. The method according to claim 1 wherein said ratio is about 95:5 and said microemulsion when contacted with wet particulate solids will form a water-in-oil coarse emulsion at 20° C.

3. A method according to claim 1 wherein said blend of surfactants consists of:

(A) an alkali metal, ammonium, alkyl ammonium, alkanol ammonium or ethoxylated alkanol ammonium salt of an alkyl or alkyl aryl sulfonic acid of the generic formula

wherein

R is an alkyl or alkyl benzene group containing 8–30 carbon atoms in the alky chain and the benzene ring may be additionally substituted with one or two alkyl groups containing 1–3 carbon atoms each;

(B) An ethoxylated surfactant of the generic formula:

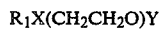

wherein
$R_1$ is an alkyl or mono- or di-alkyl aryl group containing 8 to 30 carbon atoms.

X is

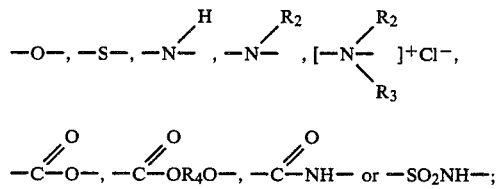

Y is —H, —$SO_3^-$ $M^+$ or —$(PO_3H)^-M^+$ wherein $M^+$ is an inorganic or ammonium cation including alkyl substituted ammonium cations;

$R_2$ is an alky group containing 1 to 20 carbon atoms or a polyethoxy ether group containing from 1 to 30 ($CH_2CH_2O$) groups;

$R_3$ is H or an alkyl group containing 1 to 3 carbon atoms;

$R_4$ is a poly hydroxy group derived from glycerol, glycols, sorbitol, or various sugars; and, n is an integer of from 1 to 30 and said hydrocarbon is selected from the group consisting of No. 2 diesel oil, kerosene, naphthas, wite oils and pure alkane 4. A method according to claim 1 wherein said solids are coal and characterized further by a subsequent step of depositing in-situ a water-in-oil coarse emulsion on the surfaces of said solids.

5. The method according to claim 4 wherein said surface moisture is slightly saline water and said water-in-oil coarse emulsion is contiguous with and continuous on the surface of said particles.

6. The method according to claim 5 wherein said saline water contains from 0.1 to 1.5 percent by weight of sodium chloride, said lipophile is dinonylphenol reacted with 9 moles of ethylene oxide and said hdydrophile is the monoethanol amine salt of dodecyl xylene sulfonic acid.

* * * * *